E. J. Leyburn.
Harvester-Rake.

N° 71890. Patented Dec. 10, 1867.

E. J. Leyburn.
Harvester-Rake.
No 71890.    Patented Dec. 10, 1867.
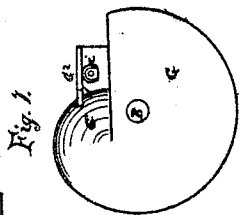
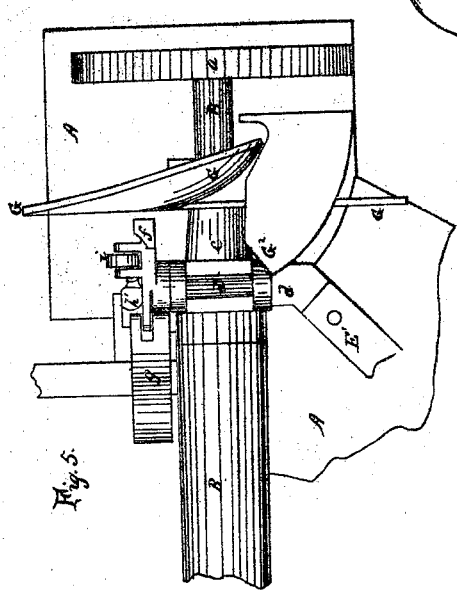
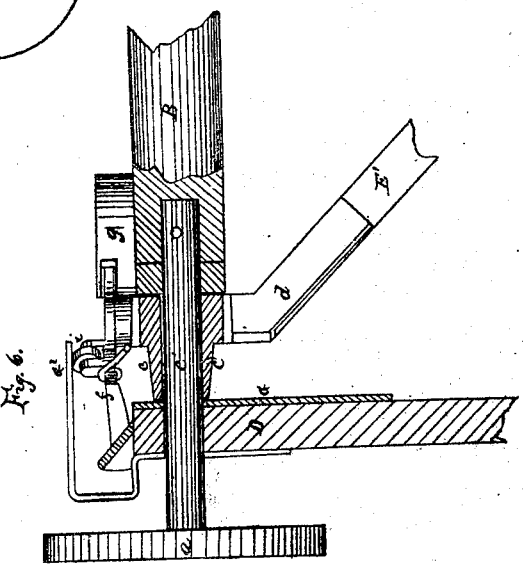
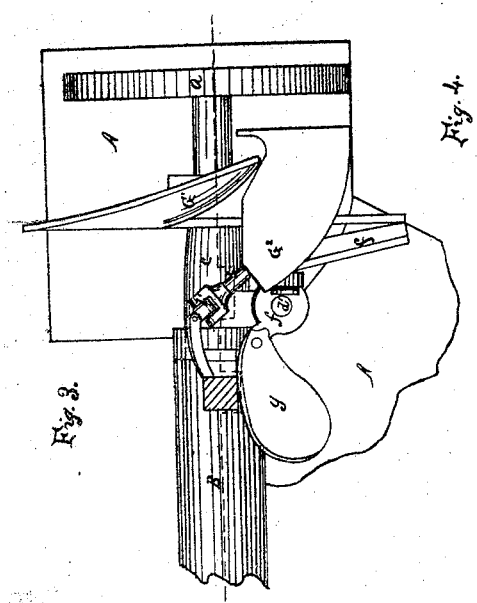
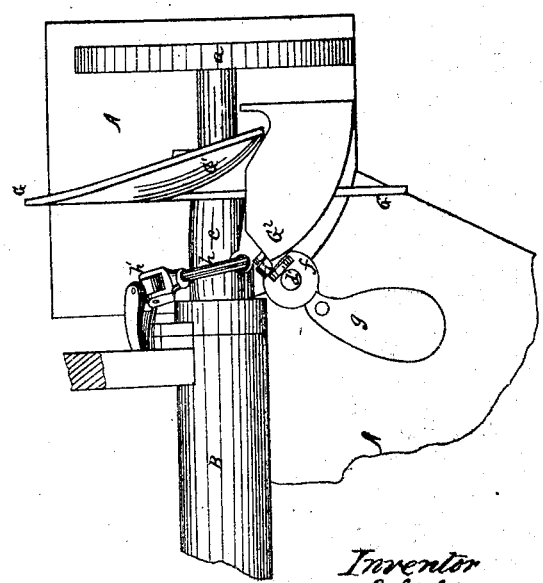
Witnesses:
Inventor
Edward J. Leyburn

United States Patent Office.

EDWARD J. LEYBURN, OF LEXINGTON, VIRGINIA.

Letters Patent No. 71,890, dated December 10, 1867.

---

IMPROVEMENT IN HARVESTER-RAKES.

---

The Schedule referred to in these Letters Patent and making part of the same.

---

TO ALL WHOM IT MAY CONCERN:

Be it known that I, EDWARD J. LEYBURN, of Lexington, in the county of Rockbridge, and State of Virginia, have invented an improved Automatic Rake for Harvesters; and I do hereby declare the following to be a full, clear, and exact description thereof, reference being had to the accompanying drawings, making part of this specification, in which—

Figure 1:
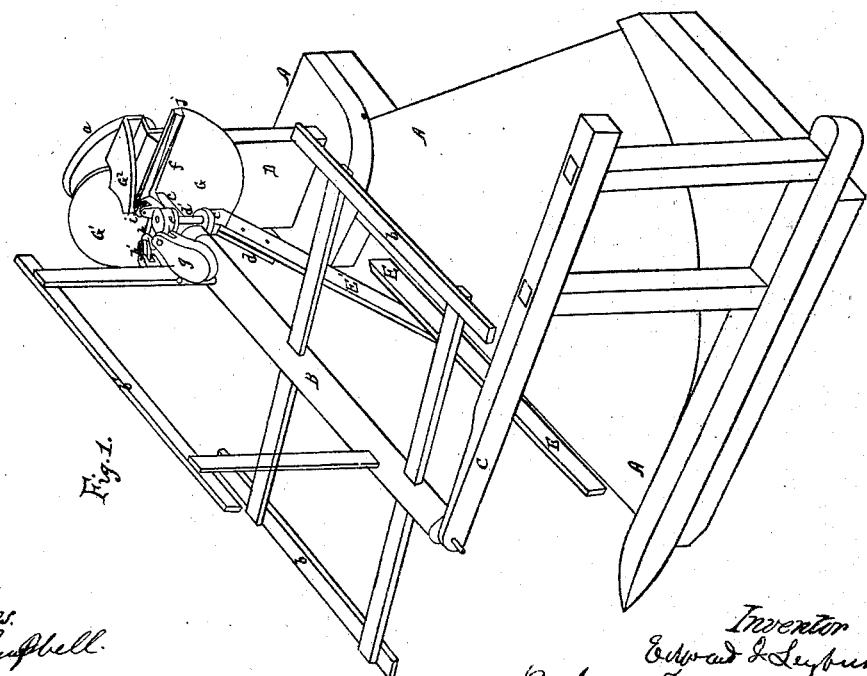

Figure 1, sheet 1, is a perspective view of the improved rake and reel, showing the rake-arm in a position to serve as a reel or gatherer.

Figure 2:
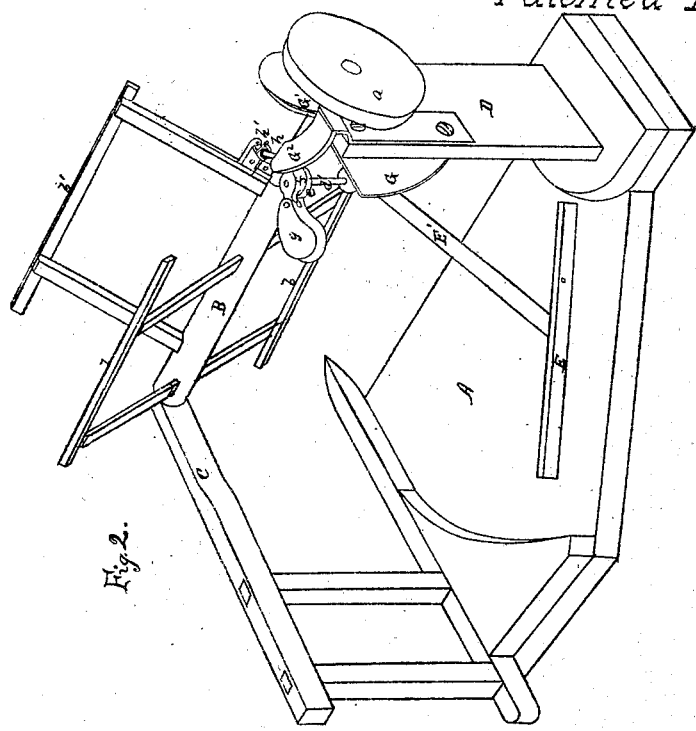

Figure 2, sheet 1, is a perspective view of the same parts, showing the rake-arm in a position for discharging a gavel.

Figure 3, sheet 2, is an enlarged top view of the devices for supporting and giving the desired movements to the rake-arm.

Figures 4, 5, 6, and 7 represent said devices in their several different positions.

Similar letters of reference indicate corresponding parts in the several figures.

This invention relates to certain novel improvements in operating that class of rake-arms which sweep over the platform in the path of a horizontal plane, so as to deliver the cut grain in gavels at one side of the machine, and then rise and assume such a position as to serve as reel or gathering-arms for gathering in the standing grain to the cutting-apparatus.

The main object of my invention is to simplify such a raking and reeling-device, by dispensing with spurred wheels, and employing instead thereof revolving jointed rods and stationary cams, so constructed and arranged as to give positive movements to the rake and reel-arm, and hold it firmly in the different positions which it is required to assume, as will be hereinafter explained.

To enable others skilled in the art to understand my invention, I will describe its construction and operation.

In the accompanying drawings, A represents a platform of a segment form, which may be applied to the front or rear side of a single or double-wheel draught-frame, and connected to such frame by means of joints, so that it will rise and fall, and conform to the undulations of the ground. B represents the reel-shaft, which is supported above the front end of the platform, and parallel thereto, by means of an outer frame, C, and an inner post, D, both of which are sustained upon the platform, so as to move in harmony with it. This reel-shaft may have on its inner end a pulley, $a$, or its equivalent, by which rotary motion can be imparted to it from driving-devices upon the main frame. If desirable, the reel-shaft may be driven by means of an extensible shaft, an extensible belt, or by any other means which will allow it, together with the platform, to rise and fall, or vibrate freely without binding or strain. If desirable, the pulley $a$ may be applied upon its shaft B by means of a clutch, or pawl and ratchet, so that, when the driving-devices are turned backward, the shaft B will not be turned backward.

Upon the shaft B three parallel reel-bars, $b\ b\ b'$, are suitably secured for gathering in the standing grain to be cut. These bars are applied upon three sides of the shaft, so as to leave a space on that side of the shaft which is opposite the reel-bar $b'$, as shown in fig. 2, for the rake-arm E, when this arm is in position for reeling, as shown in fig. 1. This rake-arm E, when in position for reeling, is in a plane parallel to the reel-shaft, and occupies the same relative position therewith that the reel-bars $b\ b\ b'$ do, so as to serve, for all intents and purposes, as a reel-arm for pressing the standing grain toward the cutting-apparatus. The reel-bars $b\ b\ b'$ are each secured to their shaft by two radial arms, as shown in figs. 1 and 2; but the rake and reel-arm E is carried by a single oblique arm, E', which extends inward to a point which is near the inner end of the reel-shaft B, and is attached to a collar, $c$, which is applied loosely upon a reduced cylindrical portion, $c'$, of said shaft, as shown in figs. 1, 5, and 6. This rake-arm E' is secured to an angular arm, $d$, a portion, $d'$, of which forms the pivot of the rake, and passes through two ears, $e\ e$, on collar $c$, so as to stand at right angles to the axis of the reel-shaft, as shown in fig. 5. A bent arm, $f$, is secured to the end of the pivot $d'$, which arm has a weight, $g$, secured or formed on its outer end, the object of which is to bring the rake-arm quickly in position, to serve as a reel, after it ceases to serve as a rake, and rises from the platform. The inner portion of said arm $f$ is bent, so as to assume a position at right angles, or nearly so, to the reel-shaft when the rake is in position to operate as a reel, and thus revolve in the path of a vertical plane. At the angle which is formed by bending this arm $f$ a short rod, $h$, is linked or pivoted at one end, the opposite end of which is attached, by a universal joint, $h'$, to the inner arm of the reel-bar $b'$, as clearly shown in figs. 1 and 4.

Near the point of connection of the rod $h$ with the arm $f$, and on that side of this arm which is uppermost when the rake is sweeping the grain from the platform, I apply an anti-friction roller, $i$, as shown in figs. 1, 4, 5, and 6.

On the outer side of the reel-post D, and at the upper end thereof, a circular cam-plate, G, is secured, a portion, $G^1$, of which is bent inward, so as to receive the arm $f$ after the rake has delivered a gavel, and move the rake into reeling position. The other portion of the face of this cam-plate G is flat, and stands in a plane perpendicular to the platform, so as to serve as an abutment for keeping arm $f$ in proper position.

When the rake-arm descends to a position for commencing to sweep around over the platform in a plane parallel thereto, the pivot $d'$ of the rake will stand perpendicular to the platform, and the anti-friction roller $i$ will abut against the lower side of an overhanging plate, $G^2$. The arm $f$ will also have been brought above the level of the straight edge, $j$ of the cam-plate G, as shown in fig. 1. This arrests the revolving motion of the rake and its pivot, and holds the loose collar $c$ stationary for a time. As the reel-shaft continues to move, the connecting-rod $h$ will cause the rake-arm to move around in the path of a horizontal plane sufficiently far to discharge the cut grain from the inner edge of the platform, as shown in fig. 2. When this has been effected, the roller $i$ will have passed from beneath the arresting-plate $G^2$, and the arm $f$ brought in contact with the cam-surface $G^1$. As the reel-shaft continues to turn, the rake-arm will rise with it, and be eased into reeling position again, before it is carried over upon the standing grain.

The weight $g$ on the outer end of the arm $f$ is designed for bringing the rake-arm quickly into reeling position after the discharge of a gavel, so that there will be little or no sliding friction caused by the action of cam-plate G $G^1$ upon the arm $f$. This weight also serves, by its contact with the inner arm of the reel-bar $b'$, as a means of sustaining the rake-arm against pressure while serving as a reel or gatherer.

It will be seen, from the above description, that the rake-arm moves around with the reel-arms in the path of a vertical plane, and thus serves as one of the reel-arms for gathering in the standing grain to be cut; and, when this arm has been brought over the cutting-apparatus or front end of the platform, its revolution with the reel-shaft is arrested, and it is caused to sweep around in the path of a horizontal plane sufficiently far to discharge the grain from the platform.

Having described my invention, what I claim, and desire to secure by Letters Patent, is—

1. Connecting the rake-arm E' to a loose collar, $c$, on reel-shaft B, by means of a pivot, $d'$, carrying an arm, $f$, in combination with the jointed connecting-rod $h$, substantially as described.

2. The arresting-plate $G^2$, in combination with the rake-pivot $d'$, arm $f$, and collar $c$, and connecting-rod $h$, substantially as described.

3. The cam-plate G $G^1$, in combination with the rake-pivot $d'$, loose collar $c$, and connecting-rod $h$, substantially as described.

4. The anti-friction roller $i$, applied to the arm $f$ of the rake-pivot, in combination with the arresting-plate $G^2$, substantially as described.

5. Connecting the arm $f$, which is in the rake-pivot $d'$, to the reel-shaft or reel-arm thereof, by means of a rod, $h$, and universal joint $h'$, substantially as described.

6. The application of a weight, $g$, to an arm, $f$, of the rake-pivot, when said arm is upon a loose collar, $c$, and arranged to operate substantially as described.

EDWARD J. LEYBURN.

Witnesses:
A. T. DENNY,
J. T. McCRUM.